US012579963B2

(12) United States Patent
Maruszewski et al.

(10) Patent No.: US 12,579,963 B2
(45) Date of Patent: Mar. 17, 2026

(54) SOUND DAMPENING SWIVELING LUGS FOR WASTE DISPOSER

(71) Applicant: INSINKERATOR LLC, Benton Harbor, MI (US)

(72) Inventors: Ryan Maruszewski, Mount Pleasant, WI (US); Walter A Bennage, Pleasant Prairie, WI (US); Jeffrey S Ward, Kenosha, WI (US); Kevin McClory, Mount Pleasant, WI (US); Kelly T Gamble, Waterford, WI (US); Dane Hofmeister, Mount Pleasant, WI (US); Srinivasan Ramalingam, Mount Pleasant, WI (US); Miles E Strand, Mount Pleasant, WI (US)

(73) Assignee: INSINKERATOR LLC, Benton Harbor, MI (US)

( * ) Notice: Subject to any disclaimer, the term of this patent is extended or adjusted under 35 U.S.C. 154(b) by 290 days.

(21) Appl. No.: 18/228,235

(22) Filed: Jul. 31, 2023

(65) Prior Publication Data

US 2025/0046287 A1 Feb. 6, 2025

(51) Int. Cl.
*G10K 11/162* (2006.01)
*E03C 1/266* (2006.01)

(52) U.S. Cl.
CPC .......... *G10K 11/162* (2013.01); *E03C 1/2665* (2013.01)

(58) Field of Classification Search
CPC ....... E03C 1/266; E03C 1/2665; G10K 11/16; G10K 11/162
See application file for complete search history.

(56) References Cited

U.S. PATENT DOCUMENTS

| | | | |
|---|---|---|---|
| 2,566,069 | A | 8/1951 | Powers |
| 2,654,986 | A | 10/1953 | Gold |
| 3,521,437 | A | 7/1970 | Risser et al. |
| 3,545,691 | A | 12/1970 | Arsenault |

(Continued)

FOREIGN PATENT DOCUMENTS

| | | | | |
|---|---|---|---|---|
| CN | 105149062 B | 10/2018 | | |
| CN | 208032731 | 11/2018 | | |
| CN | 208032731 U * | 11/2018 | ............. | B02C 18/12 |

(Continued)

OTHER PUBLICATIONS

Translation of JP-10018670-A.*

(Continued)

*Primary Examiner* — Bobby Yeonjin Kim
(74) *Attorney, Agent, or Firm* — Brooks Kushman, P.C.

(57) ABSTRACT

Sound dampening swiveling lugs for food waste disposers, food waste disposers having sound dampening swiveling lugs, and methods of making food waste disposers having sound dampening swiveling lugs are provided. Sound dampening swiveling lugs may include a lug portion, a fastening post, and a sound dampening material on a contact surface between the fastening post and the lug portion. Food waste disposers include a grinding section with a rotating shedder plate that includes at least one sound dampening swiveling lug. Methods of making a food waste disposer include attaching a sound dampening material to a contact surface between the fastening post and the lug portion of a sound dampening swiveling lug.

13 Claims, 7 Drawing Sheets

(56) References Cited

U.S. PATENT DOCUMENTS

| | | | | |
|---|---|---|---|---|
| 4,175,367 | A | 11/1979 | Bouet | |
| 2022/0274119 | A1* | 9/2022 | Sandoval | E03C 1/2665 |

FOREIGN PATENT DOCUMENTS

| | | | | | |
|---|---|---|---|---|---|
| CN | 211051654 | | | 7/2020 | |
| CN | 212820289 | | | 3/2021 | |
| CN | 213329269 | | | 6/2021 | |
| CN | 213329269 | U | * | 6/2021 | E03C 1/266 |
| DE | 2207931 | C3 | | 7/1974 | |
| DE | 2431464 | A1 | * | 1/1976 | B02C 18/14 |
| DE | 2431464 | C2 | | 11/1982 | |
| DE | 4019863 | A1 | | 9/1991 | |
| GB | 686176 | | | 1/1953 | |
| GB | 1112542 | | | 5/1968 | |
| JP | 08020312 | A | | 1/1996 | |
| JP | 10018670 | A | * | 1/1998 | E05C 17/22 |
| KR | 1007171806 | B1 | | 5/1999 | |
| KR | 101715860 | B1 | | 3/2017 | |

OTHER PUBLICATIONS

Translation of DE-2431464-A1.*
Translation of CN-208032731-U.*
Translation of CN-213329269-U.*

* cited by examiner

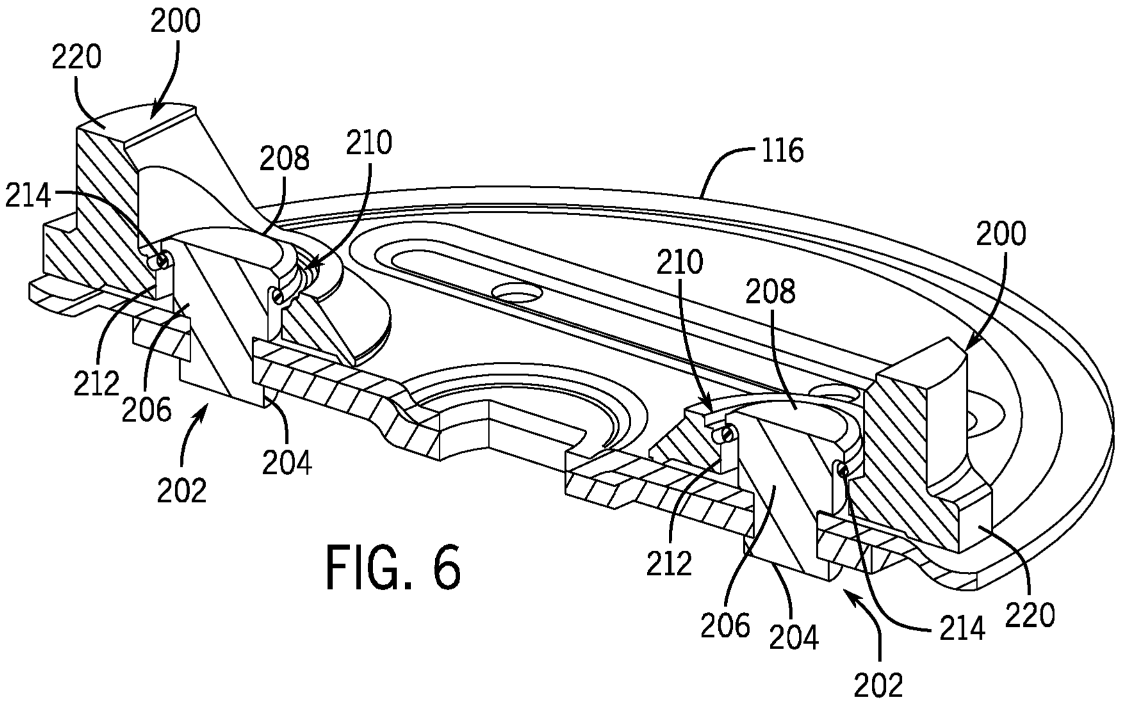
FIG. 6
FIG. 7
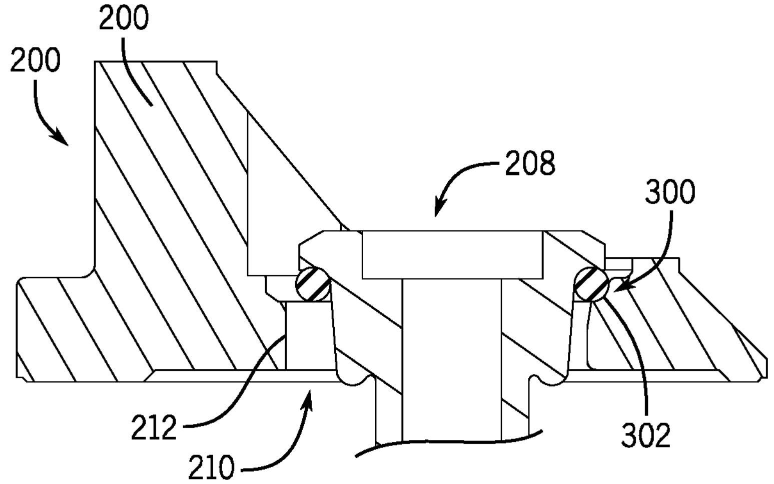
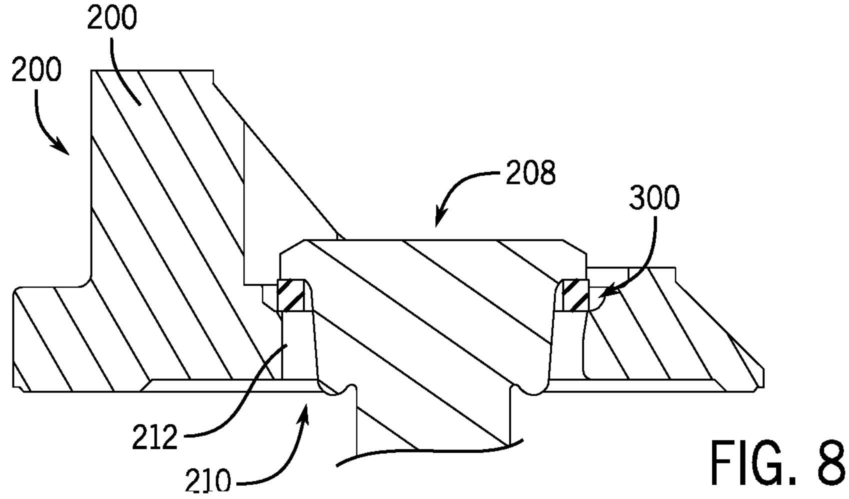
FIG. 8

SOUND DAMPENING SWIVELING LUGS FOR WASTE DISPOSER

FIELD OF THE INVENTION

The present technology relates to food waste disposers, and more particularly, to sound dampening swiveling lugs used in food waste disposers.

BACKGROUND

Food waste disposers are used to comminute food scraps into particles small enough to safely pass through household drain plumbing. Referring to FIG. 1 (Prior Art), a conventional food waste disposer 10 is often mounted to a sink (not shown), such as a kitchen sink, and includes a food conveying section 12, a motor section 14, and a grinding section 16 disposed between the food conveying section and the motor section. The food waste disposer 10 includes a housing 18 that contains the food conveying section 12, the motor section 14, and the grinding section 16. The food conveying section 12 includes an inlet 20 for receiving food waste and water. The food conveying section 12 conveys the food waste to the grinding section 16, and the motor section 14 includes a motor imparting rotational movement to a shaft to operate the grinding section.

Referring to FIG. 2 (Prior Art), cross-section of one example of a known grinding section 16 is shown. The illustrated grinding mechanism 22 includes a rotating shredder plate 24 with movable lugs 26 and 38 and a stationary grind ring 28. The movable lugs 26 and 38 are each mounted to the shredder plate 24 by a respective rivet. The shredder plate 24 is mounted to the shaft 30. The stationary grind ring 28, which includes a plurality of notches 32 defining spaced teeth 34, is fixedly attached to an internal wall 44 of a housing 18 In the operation of a food waste disposer having the grinding mechanism shown in FIG. 2, the food waste delivered by the food conveying section 12 to the grinding mechanism 22 is forced by the movable lugs 26 and 38 against the teeth 34 of the stationary grind ring 28. The edges of the teeth 34 grind the food waste into particulate matter sufficiently small to pass from above the shredder plate 24 to below the shredder plate 24 via the notches 32 between the rotating and stationary members. Due to gravity, the particulate matter that passes through the gaps between the teeth 34 drops onto an upper end frame 40 and, along with water injected into the disposer, is discharged through a discharge outlet 42.

Sound and vibration are often important considerations when consumers select a food waste disposer. Some primary sources of noise during operation are the impact of food particles against the grinding mechanism and/or the wall of the grind chamber. Additionally, current waste disposer designs allow for metal on metal contact between the movable lugs and the rivets attaching them to the rotating shredder plate, causing noticeable noise during grinding.

To reduce noise, it has been known to place sound insulating material around the exterior housings of conventional disposers, and using a baffle located at the top of the grind chamber to reduce the direct sound path to the area above the sink. However, such approaches merely muffle sound and vibration that is generated by the food waste disposer. It would be desirable to develop features and methods of preventing or reducing the amount of sound and vibration generated by the food waste disposer.

SUMMARY

Sound dampening swiveling lugs for food waste disposers, and food waste disposers having sound dampening swiveling lugs, are provided herein.

In at least a first aspect, a sound dampening swiveling lug for a waste disposer is provided. The sound dampening swiveling lug includes a lug portion having an opening bounded by an inner rim. The sound dampening swiveling lug also includes a fastening post that extends through the opening in the lug portion. The sound dampening swiveling lug further includes a sound dampening material on a contact surface between the fastening post and the lug portion.

At least some examples of sound dampening swiveling lugs of the first aspect may include additional features. For example, the fastening post may include a first end, an intermediate section, and a second end that is retained above the opening in the lug portion of the sound dampening swiveling lug. The opening bounded by the inner rim may be circular or elongated. The sound dampening material may be made of an elastomer or a polymer.

In at least a second aspect, a food waste disposer is provided that includes a food conveying section, a motor section, and a grinding section disposed between the food conveying section. The grinding section includes a rotating shredder plate having at least one sound dampening swiveling lug. The at least one sound dampening swiveling lug includes a lug portion having an opening bounded by an inner rim. The at least one sound dampening swiveling lug also includes a fastening post that extends through the opening in the lug portion, wherein the fastening post movably attaches the sound dampening swiveling lug to the rotating shredder plate. The at least one sound dampening swiveling lug further includes a sound dampening material on a contact surface between the fastening post and the lug portion.

At least some examples of food waste disposers of the second aspect may include additional features. For example, the fastening post may include a first end that is retained beneath the rotating shredder plate, an intermediate section that extends through the opening in the lug portion and through a hole in the rotating shredder plate, and a second end that is retained above the opening in the lug portion of the sound dampening swiveling lug. The opening bounded by the inner rim may be circular or elongated. The sound dampening material may be made of an elastomer or a polymer.

In some examples of sound dampening swiveling lugs of the first aspect and food waste disposers of the second aspect, the contact surface may be on the fastening post. In such examples, the sound dampening material may be a ring that is attached to a portion of the fastening post.

In other examples of sound dampening swiveling lugs of the first aspect and food waste disposers of the second aspect, the contact surface may be on the inner rim. In some such examples, the inner rim may include a plurality of channels, the sound dampening material may include a plurality of inserts, and each insert of the plurality of inserts may be inserted into one of the plurality of channels. In other such examples, the sound dampening material may be coated or overmolded onto the inner rim.

In at least a third aspect, a method of providing a waste disposer having at least one sound dampening swiveling lug is provided. The method includes providing at least one lug portion of a movable lug to be installed into a waste disposer, the lug portion having an opening bounded by an inner rim. The method also includes providing at least one fastening post, the fastening post being configured to mount the at least one lug portion to a rotating shredder plate of the waste disposer. The method further includes attaching a sound dampening material to a contact surface between the fastening post and the lug portion, resulting in forming at least one sound dampening swiveling lug. The method also includes installing the at least one sound dampening swiveling lug onto the rotating shredder plate of the waste disposer.

Methods of providing a waste disposer having at least one sound dampening swiveling lug may also include additional features or steps. For example, attaching a sound dampening material to a contact surface between the fastening post and the lug portion may include attaching the sound dampening material to a portion of the fastening post. In another example attaching a sound dampening material to a contact surface between the fastening post and the lug portion may include coating or overmolding a sound dampening material onto the inner rim. In a further example, attaching a sound dampening material to a contact surface between the fastening post and the lug portion may include providing a plurality of channels in the inner rim and inserting a sound dampening insert into each channel.

BRIEF DESCRIPTION OF THE DRAWINGS

Specific examples have been chosen for purposes of illustration and description, and are shown in the accompanying drawings, forming a part of the specification.

FIG. 6 is a cross-sectional view of the sound dampening swiveling lugs installed on the rotating shredder plate of FIG. 5, taken along line 6-6 of FIG. 5, having a first embodiment of sound dampening material of the present technology.

FIG. 7 is a cross-sectional view of the lug portion and a portion of the fastening post of a sound dampening swiveling lug of the present technology, having a first example of the sound dampening material of the first embodiment.

FIG. 8 is a cross-sectional view of the lug portion and a portion of the fastening post of a sound dampening swiveling lug of the present technology, having a second example of the sound dampening material of the first embodiment.

Figure 1:
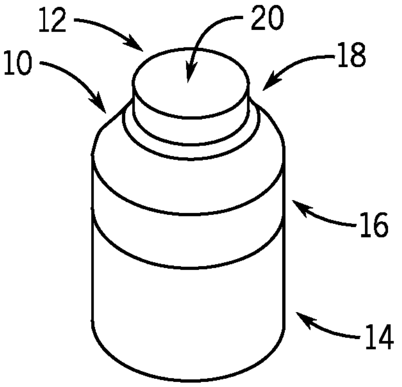
FIG. 1 (PRIOR ART)
FIG. 1 is a simplified schematic view of one example of a Prior Art food waste disposer.
Figure 2:
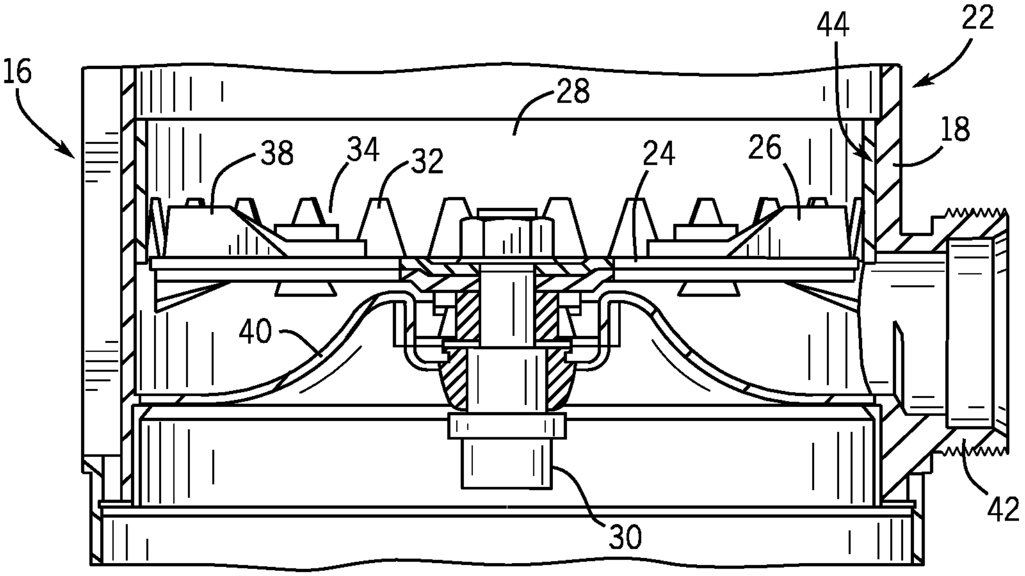
FIG. 2 (PRIOR ART)
FIG. 2 is a cross-sectional view of a grinding section of the Prior Art food waste disposer, such as the waste disposer of FIG. 1.

While various embodiments discussed herein are amenable to modifications and alternative forms, aspects thereof have been shown by way of example in the drawings and are described in detail herein. It should be understood, however, that the disclosure is not limited to the particular embodiments described, and instead is meant to include all modifications, equivalents, and alternatives falling within the scope of the disclosure. In addition, the terms "example" and "embodiment" as used throughout this application is only by way of illustration, and not limitation, the Figures are not necessarily drawn to scale, and the use of the same reference symbols in different drawings indicates similar or identical items unless otherwise noted.

DETAILED DESCRIPTION

Sound dampening swiveling lugs for food waste disposers, and food waste disposers having sound dampening swiveling lugs, of the present technology include a sound dampening material to reduce or eliminate metal on metal contact noises caused by movement of the lugs during waste disposer operation.

Figure 3:
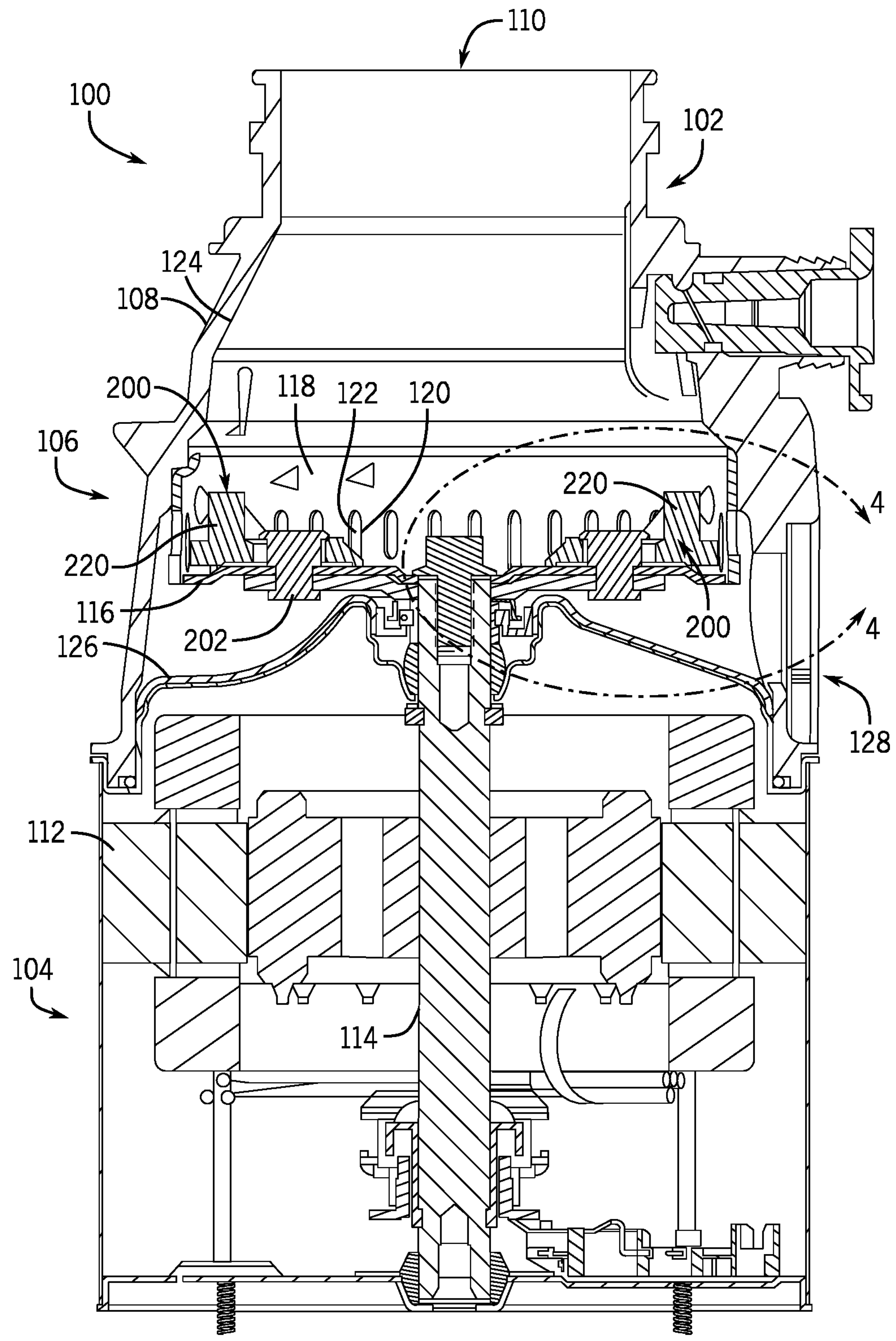
FIG. 3 is a cross-sectional view of a waste disposer of the present technology, having sound dampening swiveling lugs installed on a rotating shredder plate.
Figure 4:
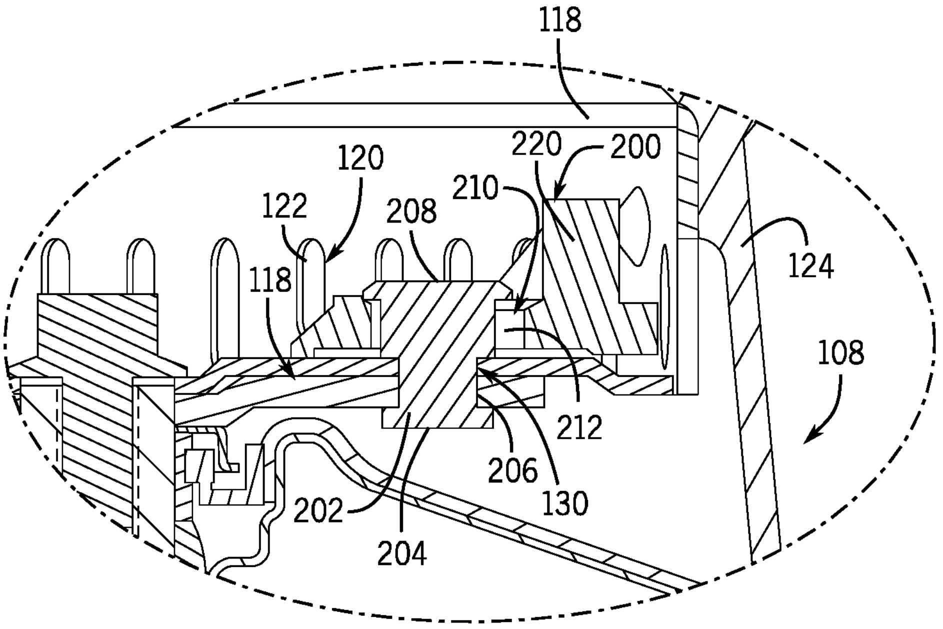
FIG. 4 is a detail view of a portion of FIG. 3, including one of the sound dampening swiveling lugs.

FIG. 3 is a cross-sectional view of a waste disposer 100 that includes at least one sound dampening swiveling lug 200. FIG. 4 is a detail view of one of the sound dampening swiveling lugs 200, and surrounding structure of, in the waste disposer 100.

Referring to FIG. 3, the waste disposer 100 may be a food waste disposer, such as the type configured to be installed under a sink (not shown) and used to comminute food waste into particles small enough to safely pass through household drain plumbing. The waste disposer 100 may include a food conveying section 102, a motor section 104, and a grinding section 106 disposed between the food conveying section 102 and the motor section 104. The food waste disposer 100 may also include a housing 108 that contains the food conveying section 102, the motor section 104, and the grinding section 106. The food conveying section 102 may include an inlet 110 for receiving food waste and water. The food conveying section 102 may convey the food waste to the grinding section 106. The motor section 104 may include a motor 112 that, when powered on, imparts rotational movement to a shaft 114 to operate the grinding section 106.

Referring to FIGS. 3 and 4, in the grinding section 106, the waste disposer 100 includes a rotating shredder plate 116 with at least one sound dampening swiveling lug 200. As shown, the rotating shredder plate 116 includes (or has mounted thereon) two sound dampening swiveling lugs 200. In alternate embodiments, the waste disposer 100 and rotating shredder plate 116 thereof may include any other number of sound dampening swiveling lugs, such as more than two sound dampening swiveling lugs. Further as shown in FIGS. 3 and 4, each sound dampening swiveling lug 200 includes both a respective lug portion 220 and a respective fastening post 202, and the respective lug portion 220 of each respective sound dampening swiveling lug 200 is mounted to the rotating shredder plate 116 by the respective fastening post 202. Each fastening post 202 may be a rivet, or any other suitable type of fastening post. The rotating shredder plate 116 may be mounted to the shaft 114. The lug portion 220 and fastening post 202 of each sound dampening swiveling lug 200 may be formed from any suitable material, such as metal, and may be formed in any suitable manner, such as being formed (e.g., in the case of the lug portion 220) from stamped sheet metal or powdered metal.

The grinding section 106 of the waste disposer 100 may also include a stationary grind ring 118. The stationary grind ring 118 may include a plurality of notches (or gaps) 120 defining spaced teeth 122, and may be fixedly attached to an internal wall 124 of the housing 108. The grinding section 106 may further include an upper end frame 126 below the rotating shredder plate 116, and a discharge outlet 128.

During operation of the waste disposer 100, food waste delivered by the food conveying section 102 to the grinding section 106 may be forced by the sound dampening swiveling lugs 200 against the teeth 122 of the stationary grind ring 118. The edges of the teeth 122 may grind the food waste into particulate matter sufficiently small to pass from above the rotating shredder plate 116 to below the rotating shredder plate 116 via the notches 120 between the rotating and stationary members. Due to gravity, the particulate matter that passes through the notches 120 between the teeth 122 may drop onto the upper end frame 126 and, along with water injected into the waste disposer 100, may be discharged through the discharge outlet 128.

Figure 5:
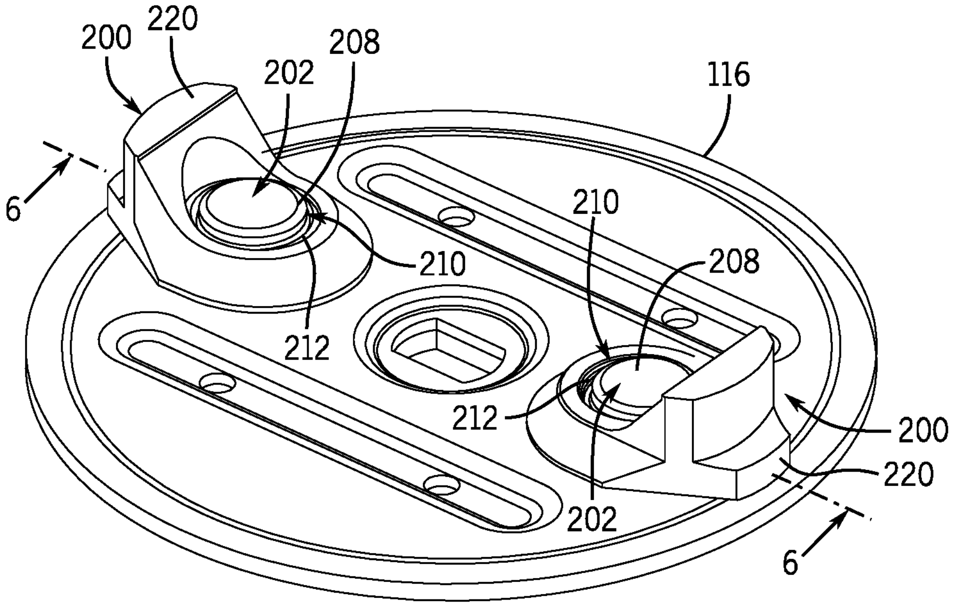
FIG. 5 is a perspective view of the sound dampening swiveling lugs installed on the rotating shredder plate of the waste disposer of FIG. 3, isolated from the waste disposer.

FIG. 5 is a perspective view of the sound dampening swiveling lugs 200 installed on the rotating shredder plate 116, isolated from remainder of the waste disposer 100. FIG. 6 is a cross-sectional view of the sound dampening swiveling lugs 200 installed on the rotating shredder plate 116 of FIG. 5, taken along a line 6-6 of FIG. 5. Referring to FIGS. 4-6, each sound dampening swiveling lug 200 is attached to a peripheral portion of the rotating shredder plate 116. In the present embodiment, the lug portion 220 of each of the sound dampening swiveling lugs 200 is movably attached to the rotating shredder plate 116 by the respective fastening post 202 of the respective sound dampening swiveling lug. Each fastening post 202 may have a respective first end 204, a respective intermediate section 206, and a respective second end 208. As illustrated, the respective first end 204 of each of the fastening posts 202 is retained beneath the rotating shredder plate 116. Also, the respective intermediate section 206 of each of the sound dampening swiveling lugs 200 extends from the respective first end 204 through a respective hole 130 in the rotating shredder plate 116, and in turn through a respective opening 210 in the respective lug portion 220 of the respective sound dampening swiveling lug, to the second end 208, which is retained above the respective opening 210 in the respective lug portion 220 of the sound dampening swiveling lug 200. The respective lug portion 220 of each respective sound dampening swiveling lug 200 includes a respective inner rim 212, and the respective opening 210 in the respective sound dampening swiveling lug 200 is bounded by the respective inner rim 212. The width and/or diameter of the respective first end 204 and the respective second end 208 of each respective fastening post 202, as installed, may be larger than the width and/or diameter of the respective intermediate section 206 of the respective fastening post. Also, the respective first end 204 of each respective fastening post 202 has a width or diameter that exceeds the width or diameter of the respective hole 130 through which that respective fastening post extends, so that the respective fastening post 202 is retained within the respective hole 130 and relative to the rotating shredder plate 116. Likewise, the respective second end 208 of each respective fastening post 202 has a width or diameter that exceeds the width or diameter of the respective opening 210 of the respective lug portion 220 through which that respective fastening post extends, so that the respective fastening post 202 is retained within that respective opening (and so that the respective lug portion is retained relative to the respective fastening post). Each sound dampening swiveling lug 200 may be a movable lug, and may rotate, swivel and/or experience translational or linear movement (or slide) relative to the rotating shredder plate 116, though the movement of each sound dampening swiveling lug 200 is restricted by the fastening post 202 that connects the sound dampening swiveling lug 200 to the rotating shredder plate 116.

Each of the sound dampening swiveling lugs 200 includes a respective portion of sound dampening material 214 on a respective contact surface between the respective fastening post 202 and the respective lug portion 220 of the respective sound dampening swiveling lug 200. The contact surface may be on the fastening post 202, such as being at or below the second end 208 of the fastening post 202, or on an upper portion of the intermediate section 206 of the fastening post 202, or on the inner rim 212 of, and/or beneath (or along another surface of) the lug portion 220 of the lug 200.

In examples where the sound dampening swiveling lugs are movable lugs, each sound dampening swiveling lug 200 may be of any suitable type of movable lug. In one example, the opening 210 in the lug portion 220 of the sound dampening swiveling lug 200 may be cylindrical, which may allow the lug 200 to rotate freely about the fastening post with one degree of freedom of movement with respect to the fastening post 202 (i.e., rotational). In another example, the opening 210 in the lug portion 220 of the sound dampening swiveling lug 200 may be elongated, such as being an oval or other elongated shape, which may allow the lug 200 two degrees of freedom of movement with respect to the fastening post 202, namely rotational and limited translational motion. In at least some examples, sound dampening swiveling lugs 200 having an elongated opening 210 may be preferred. For example, when grinding hard objects, sound dampening swiveling lugs 200 having an elongated opening 210 may have less potential to jam than sound dampening swiveling lugs 200 having a cylindrical opening 210.

Sound dampening material 214 of the present technology may be any suitable material. In some examples, sound dampening material 214 may be made of an elastomer or a polymer, such as rubber or plastic.

Sound dampening material 214 of the present technology may be applied, or attached, to a contact surface between the fastening post 202 and the opening 210 in the sound dampening swiveling lug 200 in any suitable manner. FIGS. 7-12 illustrate various embodiments of sound dampening materials, as well as variations of those embodiments, each of which may be used as a sound dampening material 214 of the present technology.

FIGS. 7 and 8 illustrate two examples of a first embodiment of sound dampening material 300 that may be attached to a contact surface between the fastening post 202 and lug portion 220 of the sound dampening swiveling lug 200. As shown in FIGS. 7 and 8, the sound dampening material 300 is ring that is attached to a portion of the fastening post 202 and extends around the circumference of the fastening post 202. The sound dampening material 300 may be attached to the fastening post 202 at or below the second end 208 of the fastening post 202, or on an upper portion of the intermediate section 206 of the fastening post 202, and is located such that it acts as a buffer, or bumper, between the fastening post 202 and the inner rim 212 around the opening 210 in the sound dampening swiveling lug 200. The dampening material 300 as shown in FIGS. 7 and 8 may be annular (e.g., circular, or generally circular), and is preferably shaped to attach securely to the fastening post 202. The dampening material 300 as shown in FIGS. 7 and 8 may have any suitable cross-sectional shape. In FIG. 7, the sound dampening material 300 is an o-ring 302, which has a circular cross-sectional shape. In FIG. 8, the sound dampening material 300 is a square ring 304, which has a square cross-sectional shape. The sound dampening material 300 may also have any suitable length. As shown in FIGS. 7 and 8, the sound dampening material is in the shape of a ring having a relatively short in length that extends along a small portion of the length of the fastening post 202. Indeed, as shown, the dampening material 300 may have a height that is equal, or almost equal to its width. In alternative examples, the dampening material 300 may be formed as a sleeve, which extends along a more substantial portion of the fastening post 202, and may have a length that is substantially longer than the width.

Figure 9:
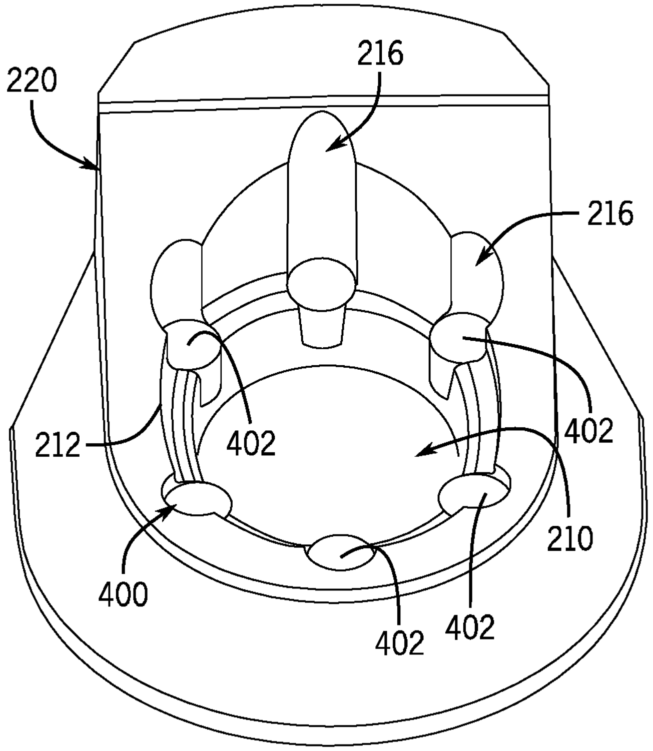
FIG. 9 illustrates a lug portion of a sound dampening swiveling lug of the present technology, having a second embodiment of sound dampening material of the present technology.
Figure 10:
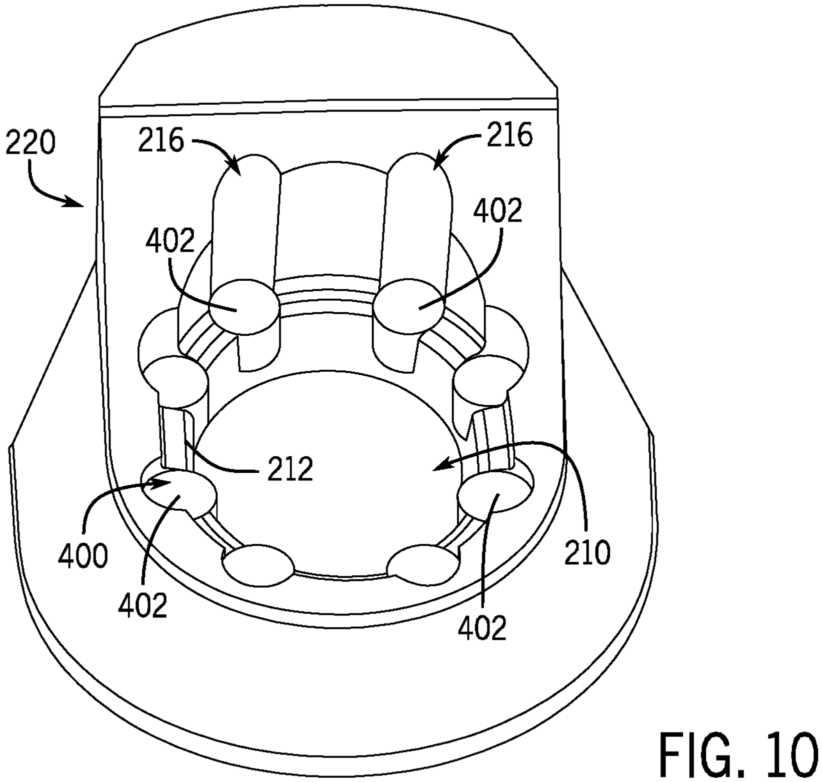
FIG. 10 illustrates a lug portion of a sound dampening swiveling lug of the present technology, having an alternative example of the sound dampening material of the second embodiment.

FIGS. 9 and 10 illustrates two examples of a second embodiment of sound dampening material 400 that may be attached to a contact surface between the fastening post 202 and the lug portion 220 of the sound dampening swiveling lug 200. As shown in FIGS. 9 and 10, the inner rim 212 around the opening 212 of the lug portion 220 of sound dampening swiveling lug 200 has a plurality of channels 216, and the sound dampening material 400 is attached to and positioned within the channels 216. The sound dampening material 400 is located such that it acts as a buffer, or bumper (or multiple bumpers), between the fastening post 202 and the lug portion 220, specifically the inner rim 212 around the opening 210 in the sound dampening swiveling lug 200. Each of the channels 216 may be vertical, or substantially vertical, in relation to the orientation of the sound dampening swiveling lug 200 as installed in a waste disposer or during operation thereof. The sound dampening material 400 includes a plurality of inserts 402, and each insert 402 is inserted into one of the channels 216. In the illustrated example, each of the channels 216 is a partial cylinder, or a substantial portion of a cylinder, that leaves one side open facing the opening 210. Each of the inserts 402 is cylindrical, or substantially cylindrical, and is configured to fit securely within the channel 216 into which it is inserted. A portion of each insert 402 extends radially inwardly into the opening 210, beyond the channel 216 in the inner rim 212. It should be understood that each of the channels 216 may be any suitable shape, and each of the inserts 402 may be any shape corresponding to the shape of the channels 216 and configured to fit securely within the channel 216 into which it is inserted. The sound dampening swiveling lug 200 may include any suitable number of channels 216, and the sound dampening material may include a corresponding number of inserts 402, one insert 402 per channel 216. For example, in FIG. 9, the sound dampening swiveling lug 200 has six channels 216 and the sound dampening material includes six inserts 402. As another example, in FIG. 10, the sound dampening swiveling lug 200 has eight channels 216 and the sound dampening material includes eight inserts 402.

Figure 11:
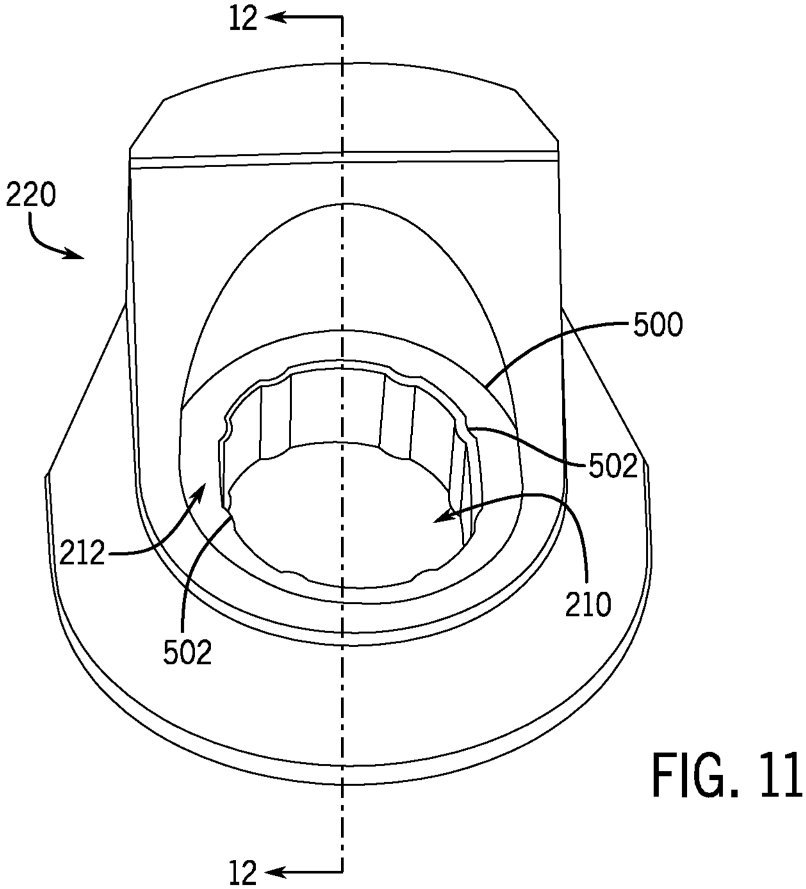
FIG. 11 illustrates a lug portion of a sound dampening swiveling lug of the present technology, having a third embodiment of sound dampening material of the present technology.
Figure 12:
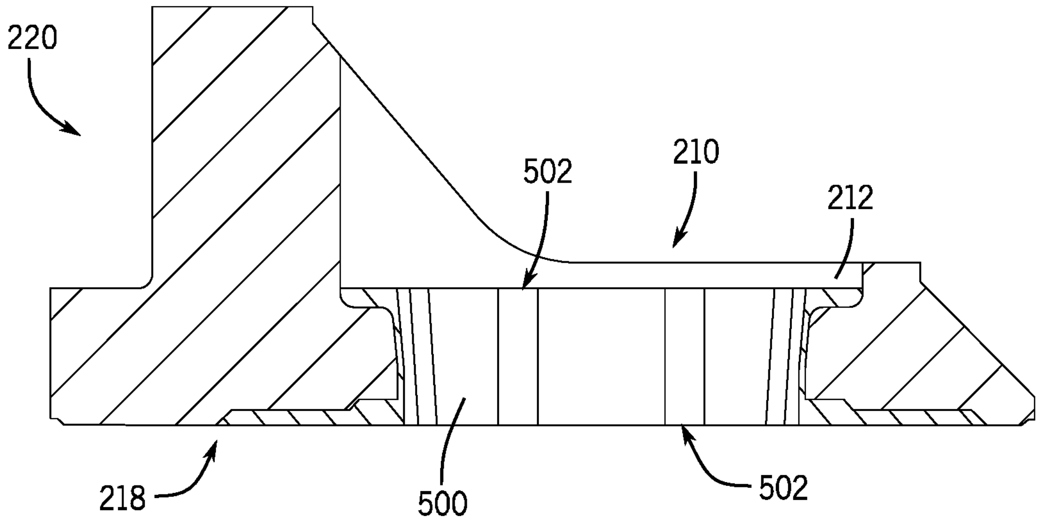
FIG. 12 is a cross-sectional view of the lug portion of a sound dampening swiveling lug of FIG. 11, taken along line 12-12 of FIG. 11.

FIGS. 11 and 12 illustrate a third embodiment of a sound dampening material 500 of the present technology that may be attached to a contact surface between the fastening post 202 and the lug portion 220 of the sound dampening swiveling lug 200. FIG. 11 illustrates a lug portion 220 of a sound dampening swiveling lug 200 of the present technology, and FIG. 12 is a cross-sectional view of the lug portion of a sound dampening swiveling lug of FIG. 11, taken along line 12-12 of FIG. 11. As shown in FIGS. 11 and 12, the sound dampening material 500 may be a coating or material that is overmolded onto (and inwardly extending from) the inner rim 212 around the opening 210) in the lug portion 220 of the sound dampening swiveling lug 200. The sound dampening material 500 is located such that it acts as a buffer, or bumper, between the fastening post 202 and the lug portion 220, specifically the inner rim 212. The sound dampening material 500 may cover the entire inner rim 212. Also, as particularly shown in FIG. 12, the sound dampening material 500 also may extend along at least a portion of the bottom 218 of the lug portion 220 of the sound dampening swiveling lug 200 (e.g., under the lug portion). The sound dampening material 500 may include a plurality of ribs 502, which may extend inwardly into the opening 210 of the sound dampening swiveling lug 200, and may provide additional sound dampening material to aid in dampening the impact between the between the fastening post 202 and the inner rim 212 around the opening 210 of the sound dampening swiveling lug 200.

Figure 13:
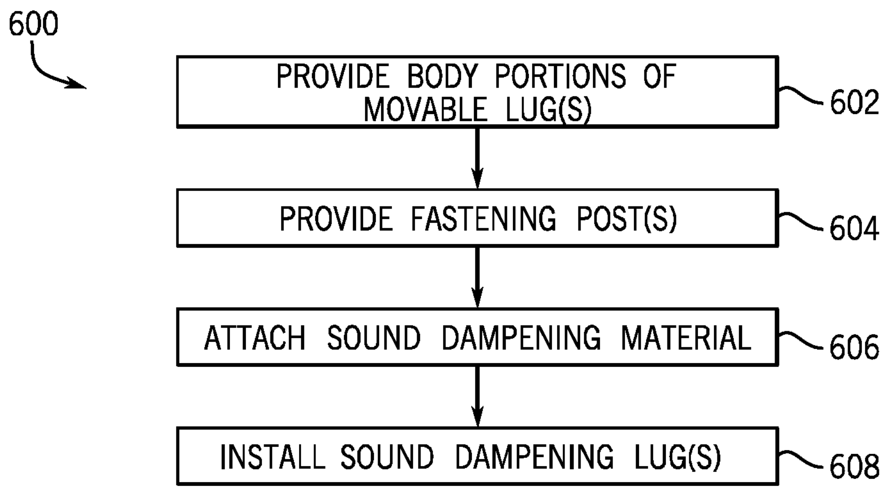
FIG. 13 illustrates one example of a method of providing a waste disposer having sound dampening swiveling lugs of the present technology.

FIG. 13 illustrates one example of a method 600 of providing a waste disposer having sound dampening swiveling lugs of the present technology.

The method 600 may begin at step 602, which includes providing at least one lug portion to be installed into a waste disposer. The lug portion may be the same type of lug portion described above with respect to lug portion 220 of lug 200, and may include an opening 210 bounded by an inner rim 212. As shown and discussed with respect to FIGS. 3, 5, and 6 above, a plurality of lug portions 220, such as at least two lug portions 220, may be provided to be installed into each waste disposer 100.

The method 600 may proceed to step 604, which includes providing at least one fastening post, the fastening post being configured to mount the at least one movable lug to a rotating shredder plate of the waste disposer. With reference to FIGS. 3, 5 and 6 above, the at least one fastening post may be a fastening post 202, which may be configured to mount a lug portion 220 to form a movable lug 200 to the rotating shredder plate 116 of the waste disposer 100. In examples, where at least two lug portions 220 are provided, the method may include providing at least two fastening posts, where each fastening post is configured to mount one of the lug portions 220 to the rotating shredder plate 116 of the waste disposer 100.

The method 600 may proceed to step 606, which includes, attaching a sound dampening material to a contact surface between the fastening post and the lug portion, resulting in forming a sound dampening swiveling lug. The contact surface may be on the fastening post, such as being at or below the second end of the fastening post, or on an upper portion of the intermediate section of the fastening post, or may be on the inner rim of, and/or beneath (or along another surface of) the lug portion of the movable lug. The sound dampening material may be any sound dampening material discussed above, such as sound dampening material 214 as discussed with respect to FIG. 6, including the sound dampening material 300 shown in FIGS. 7 and 8, the sound dampening material 400 shown in FIGS. 9 and 10, or the sound dampening material 500 shown in FIGS. 11 and 12. Accordingly, when the sound dampening material is a sound dampening material 300 as shown in FIGS. 7 and 8, the step of attaching a sound dampening material to a contact surface between the fastening post and the opening in the movable lug may include attaching a sound dampening material to a portion of the fastening post 202, at a location such that it acts as a buffer, or bumper, between the fastening post 202 and the inner rim 212 around the opening 210 in the sound dampening swiveling lug 200. That location may be at or below the second end 208 of the fastening post 202, or on an upper portion of the intermediate section 206 of the fastening post 202. In examples where the sound dampening material is a sound dampening material 400 as shown in FIGS. 9 and 10, the step of attaching a sound dampening material to a contact surface between the fastening post and the opening in the movable lug may include providing a plurality of channels 216 in the inner rim 212 of the lug 200 and inserting a sound dampening insert 402 into each channel 216. In examples where the sound dampening material is a sound dampening material 500 as shown in FIGS. 11 and 12, the step of attaching a sound dampening material to a contact surface between the fastening post and the opening in the movable lug may include coating or overmolding a sound dampening material 500 onto the inner rim 212 of the opening 210 of the lug 200. In examples where at least two movable lugs and at least two fastening posts are provided, step 606 of the method may be repeated for each combination of one fastening post and one movable lug, as many times as needed to form the desired number of sound dampening swiveling lugs based on the number of movable lugs and fastening posts are provided.

The method 600 may proceed to step 608, which includes installing at least one sound dampening swiveling lug onto a rotating shredder plate of a waste disposer. In some examples, such as the examples shown in FIGS. 3, 5 and 6 above, step 608 includes installing at least two sound dampening swiveling lugs onto the rotating shredder plate of the waste disposer.

It should be understood that, although the method above is described in a particular order, the steps of the method may be performed in any suitable order. For example, the sound dampening material can be added to the to the lug portion of the lug, or to the fastening post, before the other component is provided. Additionally, the sound dampening material may be added to the to the lug portion of the lug, or to the fastening post, before or after the lug portion is assembled relative to the fastening post, as suitable for the specific embodiment.

One or more of the embodiments encompassed herein can be advantageous in any of a variety of respects. For example use of damping material between the lugs and fastening posts may reduce or eliminate the metal on metal contact noise generated by standard waste disposers having lugs. As another example, the damping material may increase the rate of grind of the waste disposer by limiting the sliding of the lug along the fastening post, which may keep the lug closer to the shredder ring when contacted by food materials.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A sound dampening swiveling lug for a waste disposer, the sound dampening swiveling lug comprising:

a lug portion having an opening bounded by an inner rim;

a fastening post that extends through the opening in the lug portion; and a sound dampening material on a contact surface on the inner rim between the fastening post and the lug portion, wherein the inner rim includes a plurality of channels, the sound dampening material includes a plurality of inserts, and each insert of the plurality of inserts is inserted into one of the plurality of channels.

2. The sound dampening swiveling lug of claim 1, wherein the fastening post includes a first end, an intermediate section, and a second end that is retained above the opening in the lug portion of the sound dampening swiveling lug.

3. The sound dampening swiveling lug of claim 1, wherein the opening bounded by the inner rim is elongated.

4. The sound dampening swiveling lug of claim 1, wherein the sound dampening material is made of an elastomer or a polymer.

5. The sound dampening swiveling lug of claim 1, wherein the contact surface is on the fastening post.

6. The sound dampening swiveling lug of claim 1, wherein the sound dampening material is a ring that is attached to a portion of the fastening post.

7. A food waste disposer comprising:

a food conveying section;

a motor section; and a grinding section disposed between the food conveying section;

wherein the grinding section includes a rotating shredder plate having at least one sound dampening swiveling lug, the sound dampening swiveling lug including:

a lug portion having an opening bounded by an inner rim;

a fastening post that extends through the opening in the lug portion, wherein the fastening post movably attaches the sound dampening swiveling lug to the rotating shredder plate; and a sound dampening material on a contact surface on the inner rim between the fastening post and the lug portion, wherein the inner rim includes a plurality of channels, the sound dampening material includes a plurality of inserts, and each insert of the plurality of inserts is inserted into one of the plurality of channels.

8. The food waste disposer of claim 7, wherein the fastening post includes a first end that is retained beneath the rotating shredder plate, an intermediate section that extends through the opening in the lug portion and through a hole in the rotating shredder plate, and a second end that is retained above the opening in the lug portion of the sound dampening swiveling lug.

9. The food waste disposer of claim 7, wherein the contact surface is on the fastening post.

10. The food waste disposer of claim 7, wherein the sound dampening material is ring that is attached to a portion of the fastening post.

11. A method of providing a waste disposer having at least one sound dampening swiveling lug, the method including:

providing at least one lug portion to be installed into a waste disposer, the lug portion having an opening bounded by an inner rim;

providing at least one fastening post, the fastening post being configured to mount the at least one lug portion to a rotating shredder plate of the waste disposer;

attaching a sound dampening material to a contact surface between the fastening post and the lug portion by coating or overmolding a sound dampening material on the inner rim, resulting in forming at least one sound dampening swiveling lug;

installing the at least one sound dampening swiveling lug onto the rotating shredder plate of the waste disposer.

12. The method of claim 11, wherein attaching a sound dampening material to a contact surface between the fastening post and the lug portion includes attaching the sound dampening material to a portion of the fastening post.

13. The method of claim 11, wherein attaching a sound dampening material to a contact surface between the fastening post and the lug portion includes providing a plurality of channels in the inner rim and inserting a sound dampening insert into each channel.

* * * * *